United States Patent [19]
Cipriani

[11] Patent Number: 6,006,437
[45] Date of Patent: Dec. 28, 1999

[54] PLUG GAUGE FOR CHECKING GEOMETRIC FEATURES OF PARTS WITH ROTATIONAL SYMMETRY

[75] Inventor: Riccardo Cipriani, Ferrara, Italy

[73] Assignee: Marposs Societa' Per Azioni, Bentivoglio, Italy

[21] Appl. No.: 08/981,534

[22] PCT Filed: Jul. 15, 1996

[86] PCT No.: PCT/EP96/03092

§ 371 Date: Dec. 12, 1997

§ 102(e) Date: Dec. 12, 1997

[87] PCT Pub. No.: WO97/06408

PCT Pub. Date: Feb. 20, 1997

[30] Foreign Application Priority Data

Aug. 3, 1995 [IT] Italy ................................ BO95A0394

[51] Int. Cl.⁶ .................................................. G01B 13/22
[52] U.S. Cl. ........................................ 33/543.1; 33/DIG. 2
[58] Field of Search .................................. 33/543, 543.1, 33/556, 600, 611, DIG. 2; 73/37, 37.5, 37.9, 40, 105

[56] References Cited

U.S. PATENT DOCUMENTS

| | | | |
|---|---|---|---|
| 2,553,129 | 5/1951 | Burnett | 73/104 |
| 2,618,965 | 11/1952 | Gray | 73/37.5 |
| 3,214,840 | 11/1965 | Fox | 33/556 |
| 3,914,872 | 10/1975 | Stzala | 33/543.1 |
| 4,034,478 | 7/1977 | Yager | 33/611 |
| 4,383,368 | 5/1983 | Morawski et al. | 33/543 |
| 4,704,896 | 11/1987 | Parsons | 33/DIG. 2 |

FOREIGN PATENT DOCUMENTS

| | | |
|---|---|---|
| 1 236 805 | 3/1967 | Germany . |
| 2 836 925 | 3/1980 | Germany . |
| 2 057 689 | 4/1981 | United Kingdom . |

OTHER PUBLICATIONS

Copy of International Search Report for International Application No. PCT/EP96/03092, Nov. 29, 1996.

*Primary Examiner*—G. Bradley Bennett
*Attorney, Agent, or Firm*—Dickstein Shapiro Morin & Oshinsky LLP

[57] ABSTRACT

A plug gauge for checking shape errors, in particular, the roundness of a valve seat. The plug gauge comprises seating surfaces adapted for cooperating with the surface of the valve seat, and a pneumatic circuit with an annular nozzle at the seating surfaces. The gauge comprises two coaxial cylindrical elements, one of the two housed within the other, that can reciprocally translate in an axial direction and that comprises associated resting surfaces, such that both cylindrical elements may rest on the seat surface to be checked. The annular nozzle is substantially defined by an internal and an external cylindrical portion of said two reciprocally movable elements.

12 Claims, 2 Drawing Sheets

PLUG GAUGE FOR CHECKING GEOMETRIC FEATURES OF PARTS WITH ROTATIONAL SYMMETRY

TECHNICAL FIELD

The invention relates to an apparatus for checking geometric features of an internal surface with rotational symmetry, of a part, with a main body and a fluidic detecting circuit, the main body including a reference element with rotational symmetry that defines a geometric axis and comprises a seating surface with rotational symmetry, for cooperating with the surface to be checked, the detecting circuit comprising a feeding unit, a detecting unit, conduits for the passage of the fluid under pressure, and a substantially annular opening, defining a nozzle at said seating surface for the emission of the fluid from said conduits.

BACKGROUND ART

The valve seats in the cylinder head of an internal combustion engine house associated valves that have the purpose of sealing the induction and exhaust conduits that lead to the combustion chamber. In order to assure the proper performance of the engine, the sealing that each valve provides must be, as a principle, absolutely airtight. However, in practice, owing to manufacturing reasons, the seating surface of the valve and that of the associated seat are subject to unavoidable shape errors that generally prevent an accurate sealing along a theoretic seating circumference, and thus generate non-contact zones where combustion air or gas leaks are formed between the conduits and the combustion chamber. These leaks determine both a drop in the performance of the engine and, owing to a faulty combustion, a rise in the amount of pollutant dispersion into the atmosphere.

In order to evaluate, before assembling a cylinder head, the extent of the sealing accuracy of the valves over their seats, it is conventional in the art to perform checkings of the geometric features of each valve seat, in particular checkings of the roundness of the conical surface of a valve seat.

There are known "plug" type devices for accomplishing geometric checkings of the conical surfaces of valve seats, disclosed, for example, in U.S. Pat. No. 2,553,129 and in German patent DE-C-2836925.

The devices disclosed in both the hereinbefore mentioned patents have a similar structure, with a central body comprising a reference surface with rotational symmetry for cooperating with the valve seat, and a cylinder-like guide stem, coaxially arranged with the body and intended for housing in the valve guide for centering the device.

The plug disclosed in the US patent has a conical reference surface and detecting means including two concentric annular rows of electric contacts in the formerly mentioned conical surface for contacting the valve seat at two distinct circumferential areas. The contacts form part of associated electric circuits that, depending on the number of contacts actually touching—in the course of the checking—the surface of the conical seat, provide indications as to possible defects, or imperfections in the valve seat.

The plug disclosed in the US patent has a structure that calls for extremely accurate machining for the reciprocal arrangement of the contacts, with respect to both the other contacts belonging to the same annular row and those belonging to the adjacent annular row.

Furthermore, as the contacts are spaced apart from one another, no complete inspection along all the points of the circumferential area is carried out.

The German patent discloses, instead, a plug with a spherical reference surface and a pneumatic detecting system with a circular slit formed in the spherical surface in correspondence with the theoretical circumference of contact. The circular slit is connected to a pneumatic circuit that leads to suitable devices that feed it and detect pressure variations.

The disclosed application requires an extremely accurate machining of the spherical surface intended for resting on the conical surface of the seat to be checked, and, above all, of the circular opening for the emission of air, the position of which must be defined with great accuracy in order to guarantee the proper operation of the plug. Thus, the structure of the plug involves high costs and inevitable inaccuracies.

DISCLOSURE OF THE INVENTION

Object of the present invention is to provide an apparatus for checking the geometric shape of internal surfaces with rotational symmetry, more specifically valve seats, that has a plain and inexpensive structure and overcomes the disadvantages of the known devices.

This object is attained by an apparatus for checking geometric features of an internal surface, with rotational symmetry, of a part, with a main body and a fluidic detecting circuit, the main body including a reference element with rotational symmetry that defines a geometric axis and comprises a seating surface with rotational symmetry, for cooperating with the surface to be checked, the detecting circuit comprising a feeding unit, a detecting unit, conduits for the passage of the fluid under pressure, and a substantially annular opening, defining a nozzle at the formerly mentioned seating surface for the emission of the fluid from said conduits. Furthermore, the apparatus comprises a slidable element, coaxial with the reference element and adapted for performing axial translation displacements with respect to it, one of the reference and slidable elements being substantially hollow, and the slidable element defining a supplemental seating surface with rotational symmetry for cooperating with the surface to be checked. The reference element and the slidable element have reciprocally facing cylindrical portions adjacent to the formerly mentioned seating surfaces and the annular opening is at least partially defined, between the formerly mentioned seating surface and supplemental seating surface, by the reciprocally facing cylindrical portions of the reference and slidable elements.

An important result attained by an apparatus according to the present invention is the fact that it enables to perform, in an extremely simple way, a checking along the portion of seat surface that, during the engine running, directly cooperates with a corresponding surface of the valve in order to ensure sealing.

The apparatus according to the invention provides the advantage whereby the checking of the shape features of a valve seat, in particular insofar as roundness is concerned, is not influenced by possible slight variations in the actual seat angle, that would not affect in any case the sealing between valve and seat.

Other advantages, that the apparatus according to the present invention provides, consist in the extremely simple method of checking, thanks to the adaptability of the structure to suit the valve seat to be checked, and also in an—even if limited—flexibility of use that enables the checking of valve seats with nominal diametral dimensions comprised within a certain range.

BRIEF DESCRIPTION OF THE DRAWINGS

An embodiment of the invention is now described in more detail with reference to the enclosed sheets of drawings, given by way of non limiting example only, wherein.

BEST MODE FOR CARRYING OUT THE INVENTION

Figure 1:
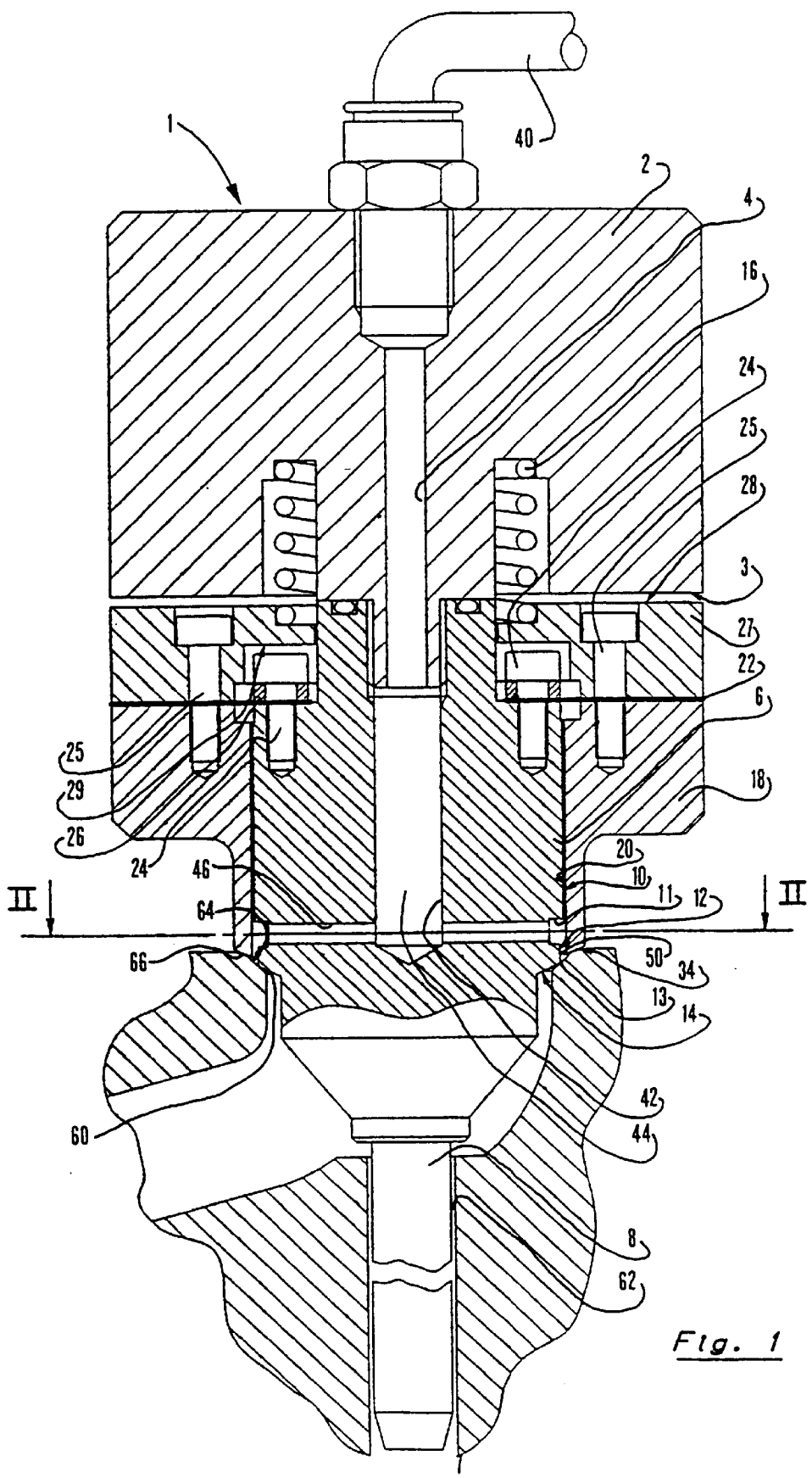
FIG. 1 is a longitudinal cross-sectional view of a plug gauge according to the present invention, with some details shown in front view.

The plug gauge 1 shown in the figures comprises a main central body 2 with rotational symmetry (substantially cylinder-shaped), that defines a longitudinal geometric axis and an axial through hole 4. An element with rotational symmetry, or fixed reference element, 6 is fixed to the central body 2 by means of a central threaded coupling. An elongate element, or guide stem 8, is rigidly coupled to the reference element 6, in an unremovable way (as shown in the figure), or by means of a rapid fastening device of a known type.

The reference element 6 defines an external cylindrical surface 10 for guiding and matching purposes, an annular cylindrical surface 12, slightly smaller insofar as the diameter sizes are concerned with respect to those of surface 10, an annular groove 11, between the cylindrical surface 10 and the annular surface 12, and a seating surface with rotational symmetry, including a conical portion 14, and a circular edge 13, between the annular surface 12 and the conical portion 14.

A hollow slidable element with rotational symmetry 18 is arranged at the exterior of the reference element 6, and is coaxial with it. An internal, guiding and matching cylindrical surface 20 of slidable element 18 faces the external surface 10 of the reference element 6 and cooperates with it for enabling axial translation displacements, by way of reciprocal slidings occurring between elements 18 and 6.

The clearance existing between the internal guiding surface and the external guiding surface 10 is, as a matter of fact, definitely smaller with respect to the amount shown, for the sake of clarity, in the figures. A typical value of the aforementioned clearance would be, for example, 20 μm.

The slidable element 18 is coupled to the reference element 6, and supported by the latter in a movable way, by means of an annular diaphragm 22, made, as an example, of rubber calendered into fabric, coupled to both elements 6 and 18 by means of six screws 24, and six screws 25 arranged about concentric circumferences and annular compression elements 26 and 27. Only two screws 24 and 25 for each element are visible in the cross-sectional view in FIG. 1. Screws 24 and the compression element 27 also define abutment surfaces that limit the axial translation displacements of the slidable element 18 with respect to the reference element 6. More specifically, with reference to the arrangement of plug 1 in FIG. 1, the upward displacements of slidable element 18 are limited by the abutment between an upper plane surface 28 of compression element 27 and an opposite lower plane surface 3 of central body 2; the downward displacements of slidable element 18 are limited, instead, by the abutment between an internal plane surface 29 of compression element 27 and the upper surfaces of the heads of the screws 24 (or of at least one of them).

Axial thrust elements comprise a compression spring 16 arranged between central body 2 and—through compression element 27—slidable element 18.

The slidable element 18 defines an external conical supplemental seating surface 34, arranged near the conical portion 14 of the seating surface of reference element 6.

Figure 4:
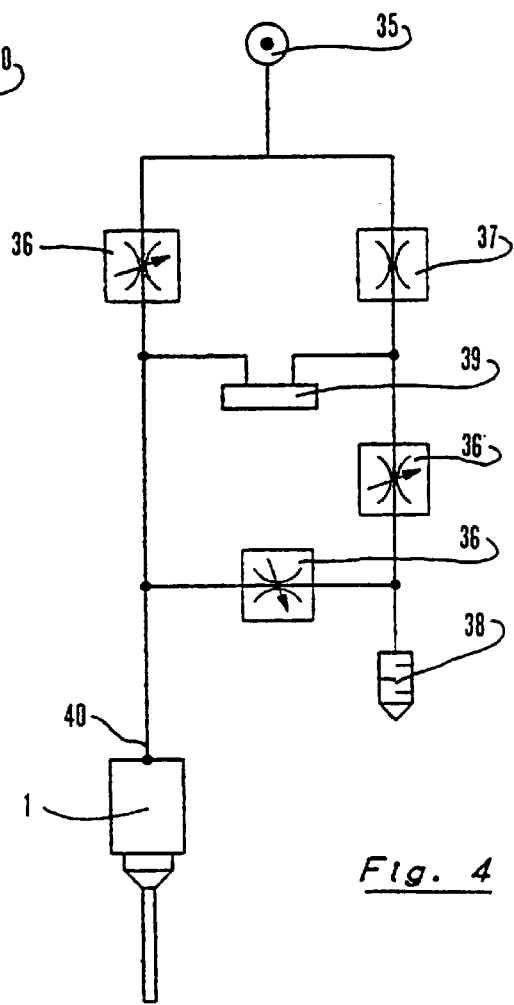
FIG. 4 is a diagram showing a fluidic detecting circuit connected to the plug gauge.

A fluidic detecting circuit can be achieved in a known way, for example as illustrated in the diagram of FIG. 4, that shows some components of a pneumatic circuit, in particular a unit 35 for feeding compressed air, adjustable flow restrictors 36, a fixed flow restrictor 37, an air exhaust device 38, and a unit 39 for detecting pressure variations. A feeding tube 40, coupled to central body 2 by means of a threaded coupling at an end of through hole 4, connects the formerly mentioned component parts to plug 1.

The reference element 6 defines an axial hole 42 that, along with hole 4 in central body 2, provides a conduit 44 for the feed of air arriving from tube 40.

Figure 2:
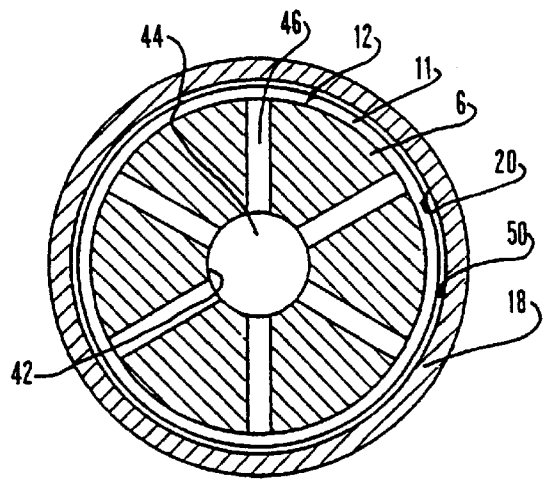
FIG. 2 is a cross-sectional view of the plug gauge shown in FIG. 1, taken along line II—II in FIG. 1.

Furthermore, element 6 defines radial holes 46, or conduits for the distribution of air, that connect feeding conduit 44 to annular groove 11. In FIG. 2 there are shown six radial holes 46, but the number of these holes can be different (for example, four).

In view of the smaller diametral dimensions of annular surface 12 with respect to guide surface 10 there is provided an opening, or annular nozzle 50, at the circular zone where the internal surface 20 of slidable element 18 and annular surface 12 face each other. The opening is directly connected with groove 11 for enabling the emission of the air arriving from the radial conduits 46.

It should be realized that the radial distance between the annular external surface 12 and the internal surface 20 of the slidable element 18 has been shown in the figures, again for the sake of simplicity, to be considerably larger than the actual size (a typical value would be, for example, 100 μm).

It should also be realized that the annular opening 50 can be obtained in a way different from that shown, for example, by making the diameter dimensions of the annular surface 12 equal to those of guiding surface 10, and by obtaining, in the position facing surface 12, an annular portion with larger diameter dimensions in the internal surface 20 of slidable element 18. In substance, the annular nozzle 50 is defined by cylindrical surface portions of reference element 6 and of slidable element 18, reciprocally facing each other near the seating surfaces 13, 14, 34, and of suitable radial dimensions.

Annular diaphragm 22 provides tightness with respect to the air that arrives from annular groove 11 and enters into the zone between external matching surface 10 and internal surface 20.

The operation of the gauge for checking the shape errors of an internal surface with rotational symmetry is hereinafter described.

It is envisaged, for example, a manually performed checking on a valve seat 60, in the cylinder head of an internal combustion engine with a vertical axis and an upper opening.

The valve seat 60, that communicates and is coaxial with a cylindrical, elongate opening, or valve guide, 62 defines a conical surface 64 connected at the top with a circular edge 66. This circular edge 66 represents the actual surface for cooperating with the associated valve in the course of the normal operation of the engine.

Plug 1 is lowered to the checking position, guided by the action of stem 8 that is inserted in the valve guide 62 (for reasons of simplicity the clearance existing between stem 8 and the surface of valve guide 62 has been shown in the figure to be of an entity considerably larger than what it would actually be).

The conical surfaces 14 and 34 have an identical angle with respect to the longitudinal axis, that is slightly greater (2/4 degrees) with respect to the nominal angle of the seat to be checked. When there are no external stresses, a portion of surface 34 is in a slightly lower position with respect to surface 14.

By virtue of an appropriate design of the diameter dimensions of the various parts of plug 1 with respect to those of seat 60 to be checked, of the small difference existing between the angles of the conical surfaces, and of the reciprocal arrangement between the surfaces 14 and 34 under the condition whereby there are no stresses, there occurs, in the course of the lowering of plug 1, a first contact between the external conical surface 34 of slidable element 18 and the circular edge 66. As the central body 2 of plug 1 further lowers and the elements 6 and 18 reciprocally slide, the circular edge 13 moves to seat upon the conical surface 64 of seat 60.

Figure 3:
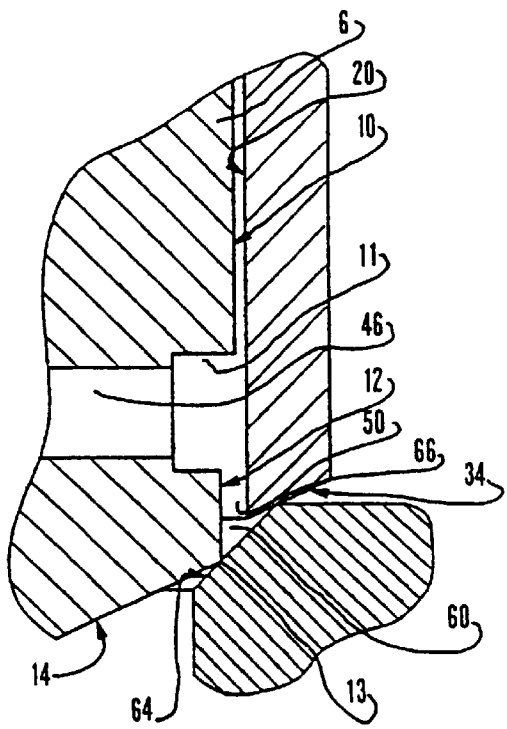
FIG. 3 shows a detail in an enlarged scale of the cross-sectional view in FIG. 1.

The diaphragm 22 allows small transversal movements (anyhow limited by the entity of the clearance between the guiding surfaces 10 and 20) between slidable 18 and reference 6 elements, guaranteeing a proper contact of both conical surface 34 and circular edge 13 on relevant parts of the valve seat, in case of small concentricity errors between the circular edge 66 and the conical surface 64 of seat 60. Under this condition (FIG. 3), the central part of plug 1, that consists of body 2 and element 6, remains in the checking position and applies a thrust, defined by its weight, to the conical surface 64 of seat 60 to be checked, while contact between slidable element 18 and edge 66 is maintained thanks to the action of spring 16.

The continuity of the two circular contact lines between reference element 6 and slidable element 18 and, respectively, conical surface 64 and circular edge 66 of the valve seat 60 is checked by the pneumatic circuit in which air is directed towards the surface of the valve seat 60 to be checked by means of feeding conduit 44, radial conduits 46, annular groove 11 and nozzle 50. More specifically, the zones of the circular surfaces in which, owing to shape errors, a correct contact does not occur, cause the air from nozzle 50 to flow therethrough, and subsequent variations in the pressure of the pneumatic circuit; these variations are detected by the detecting unit 39 of the pneumatic circuit.

The possibility that the elements 6 and 18 reciprocally slide, enables the two formerly mentioned circular contacts to be independent. In this way, the checking is unaffected by possible limited variations of the angle of conical surface 64, that do not influence in any way the proper sealing of the valve.

Furthermore, the checking is particularly reliable as one of the circular contacts being checked is exactly in the surface area (edge 66) that operatively accomplishes the sealing with a surface of the associated valve.

The drawings and the related description refer, as previously outlined, to a gauge that is particularly suitable for manually checking valve seats with a vertical axis, in which the central body 2 has suitable dimensions so as to provide a handgrip for an operator, and the reference element 6 rests on seat 60 by virtue of its weight. In these applications the spring 16, that urges from opposite sides central body 2 and slidable element 18, has appropriate dimensions for enabling (when the operator releases the plug in the checking position) equally shared out and constant thrusts of the reference element 6 and of the slidable element 18 on the surface of seat 60, so as to improve the accuracy of plug gauge 1.

An alternative solution, also in the field of manually performed checkings of valve seats with a vertical axis, could consist in an appropriate dimensioning of the masses of the reference element 6 and slidable element 18, that enables to obtain—even if spring 16 is not provided—the same constant and equally shared out distribution of the thrusts.

A gauge according to the present invention can be employed in applications for carrying out automatical checkings. In a typical application, the main body of the gauge is connected to a part of the machine, arranged along a generic, not necessarily vertical, axis, by means of known coupling devices allowing limited movements to the whole gauge for centering the guide stem in the valve guide. In such a case, in order to define the thrusts applied by, respectively, the reference element and the slidable element, distinct resilient means are generally provided, or elements that in any case enable to distinctly determine their thrusts.

The effect of the compressed air circulating in the pneumatic circuit on proper surfaces of the gauge components, may be employed to provide the required thrusts to the slidable and/or reference elements, replacing the resilient means.

A plug gauge according to the invention may have components arranged in a different way with respect to the gauge shown in the drawings. For example, a hollow reference element, substantially similar to element 18, may be fixed to the main body 2, whereas a central element, similar to element 6, may be slidably arranged internally to the hollow fixed element. In such a case the pneumatic conduits may be formed partially within the central (slidable) element. Different fluidic detecting circuits, with respect to the pneumatic circuit illustrated in the figures and hereinbefore described, can be used in a plug gauge according to the present invention, for example, hydraulic circuits of a known type.

The figures and the description referred to above apply to the checking of a valve seat 60 with conical surface 64. However, the plug gauge 1 can also be used for checking internal surfaces with rotational symmetry that have a different profile and, for example, a convex cross-section.

I claim:

1. Apparatus for checking geometric features of an internal surface (60,64,66), with rotational symmetry, of a part, with a main body (2) and a fluidic detecting circuit (35–40, 44,46,50), the main body (2) including a reference element with rotational symmetry (6) that defines a geometric axis and comprises a seating surface (13,14) with rotational symmetry, for cooperating with the surface to be checked (64), the detecting circuit comprising a feeding unit (35), a detecting unit (39), conduits (44,46) for the passage of the fluid under pressure, and a substantially annular opening (50), defining a nozzle at said seating surface (14) for the emission of the fluid from said conduits, characterized in that the apparatus further comprises a slidable element with rotational symmetry (18), coaxial with the reference element (6) and adapted for performing axial translation displacements with respect to the reference element, one of said reference and slidable elements being substantially hollow, the slidable element (18) defining a supplemental seating surface (34) with rotational symmetry for cooperating with the surface (64) to be checked, the reference element (6) and the slidable element (18) having reciprocally facing cylindrical portions (12,20), adjacent to said seating surfaces (13,14,34), and said annular opening (50) being at least partially defined, between said seating surface (13) and supplemental seating surface (34), by the reciprocally facing cylindrical portions of the reference and slidable elements.

2. An apparatus according to claim 1, for checking the geometric features of a valve seat (60,64,66) being in communication and coaxial with an associated valve guide (62), including a guide stem (8) integral with one of said reference and slidable elements (6,18), adapted for being inserted in the valve guide (62) for guiding the apparatus onto the seat (60) to be checked.

3. An apparatus according to claim 2, wherein the detecting circuit is of the pneumatic type.

4. An apparatus according to one of claims 2 and 3, wherein said slidable element (18) has a substantially hollow shape and is arranged at the exterior of said reference element (6), the guide stem (8) being integral with the reference element (6).

5. An apparatus according to claim 4, wherein the reference element (6) and the slidable element (18) have external (10) and internal (20) guiding and matching cylindrical surfaces, for reciprocally cooperating in order to match to each other said reference element (6) and slidable element (18), and guide said axial translation displacements.

6. An apparatus according to claim 5, wherein at least one of said cylindrical portions of the reference and slidable elements have a different diametral size with respect to the guiding and matching cylindrical surfaces (10,20).

7. An apparatus according to claim 6, wherein an annular surface (12) is adjacent to the seating surface (13,14) of the reference element (6), the annular surface (12) a smaller diameter with respect to the relevant guiding and matching surface (10), the annular surface (12) and a portion of the internal cylindrical surface (20) of the slidable element (18) defining said reciprocally facing cylindrical portions.

8. An apparatus according to claim 7, for checking a valve seat (60) that comprises a conical surface (64) and a circular edge (66), wherein said supplemental seating surface (34) of the slidable element (18) is adapted to cooperate with said circular edge (66).

9. An apparatus according to claim 8, wherein the seating surface of the reference element (6) comprises a conical portion (14) and a circular edge (13), said circular edge (13) of the reference element (6) being adapted to cooperate with the conical surface (64) of the seat.

10. An apparatus according to claim 9, wherein an annular diaphragm (22) is fixed to the reference element (6) and to the slidable element (18) for providing the pneumatic sealing in an opposite direction with respect to the seating surfaces (13,14,34).

11. An apparatus according to claim 10, further comprising an axial thrust element (16), arranged between the main body (2) and the slidable element (18), adapted to determine the thrust applied by the seating surface (34) of the slidable element (18) to the surface of the seat to be checked (60) with respect to the thrust applied on the same surface of the seat (60) by the seating surface (13,14) of the reference element (6).

12. An apparatus according to claim 11, wherein said conduits (44,46) for the passage of the fluid under pressure comprise an axial feeding conduit (4,42,44), radial distribution conduits (46) and an annular groove (11) at said nozzle (50).

* * * * *

UNITED STATES PATENT AND TRADEMARK OFFICE
CERTIFICATE OF CORRECTION

PATENT NO.   : 6,006,437

DATED        : December 28, 1999

INVENTOR(S)  : Ricardo Cipriani

It is certified that errors appear in the above-identified patent and that said Letters Patent is hereby corrected as shown below:

In the Abstract – a) 1st line of the abstract, the comma after "in particular" should be deleted;

b) 8th line of the abstract, "comprises" should be changed to --comprise--.

In the Description – column 3, 39th line, --20 -- should be added after "surface".

In the Claims – claim 7, 3rd line of the claim, --has-- should be added after "annual surface 12".

Signed and Sealed this

Twenty-first Day of November, 2000

Attest:

Q. TODD DICKINSON

*Attesting Officer*       *Director of Patents and Trademarks*